Nov. 26, 1957  A. SILVER  2,814,241
SLAVE VALVE FLOW DISTRIBUTION MEANS
Filed March 16, 1953  3 Sheets-Sheet 1
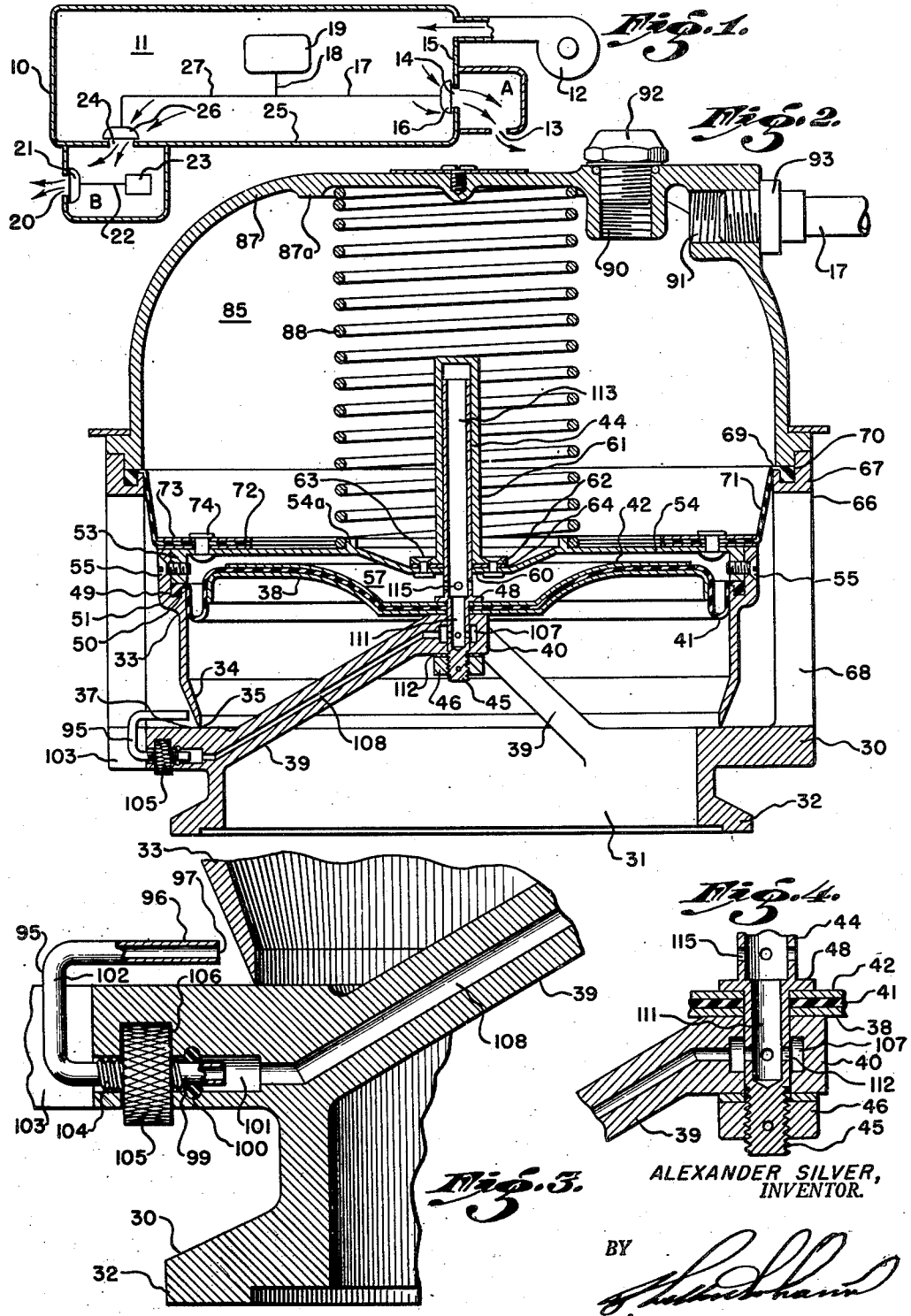
ALEXANDER SILVER,
INVENTOR.
BY
ATTORNEY

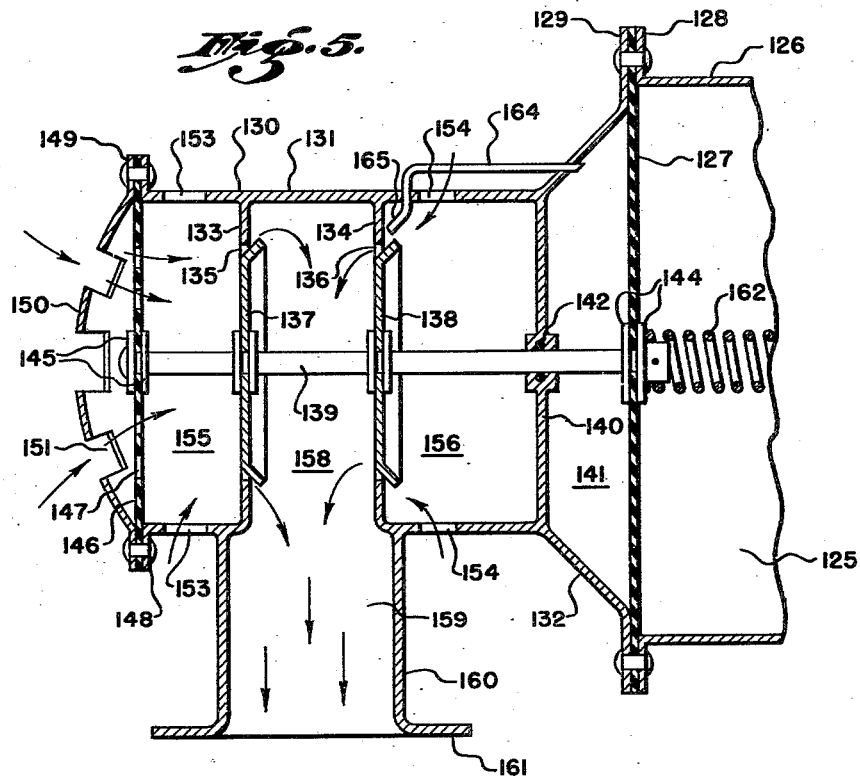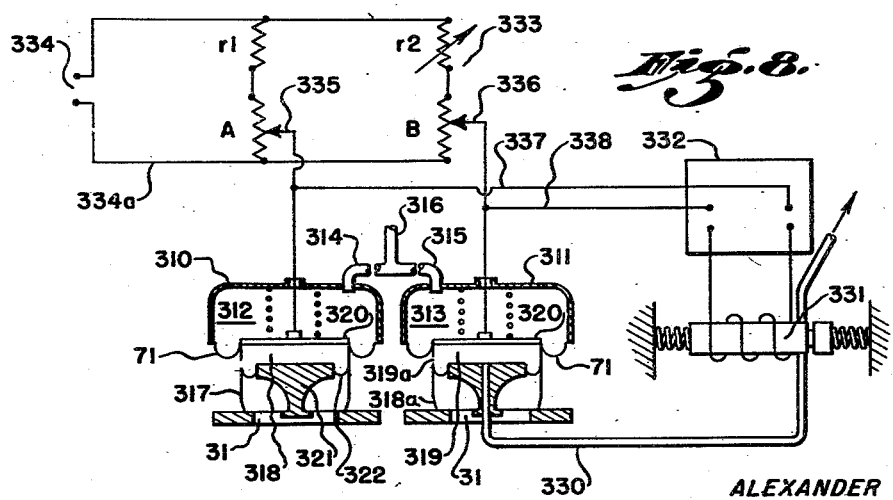

Nov. 26, 1957 A. SILVER 2,814,241
SLAVE VALVE FLOW DISTRIBUTION MEANS
Filed March 16, 1953 3 Sheets-Sheet 3
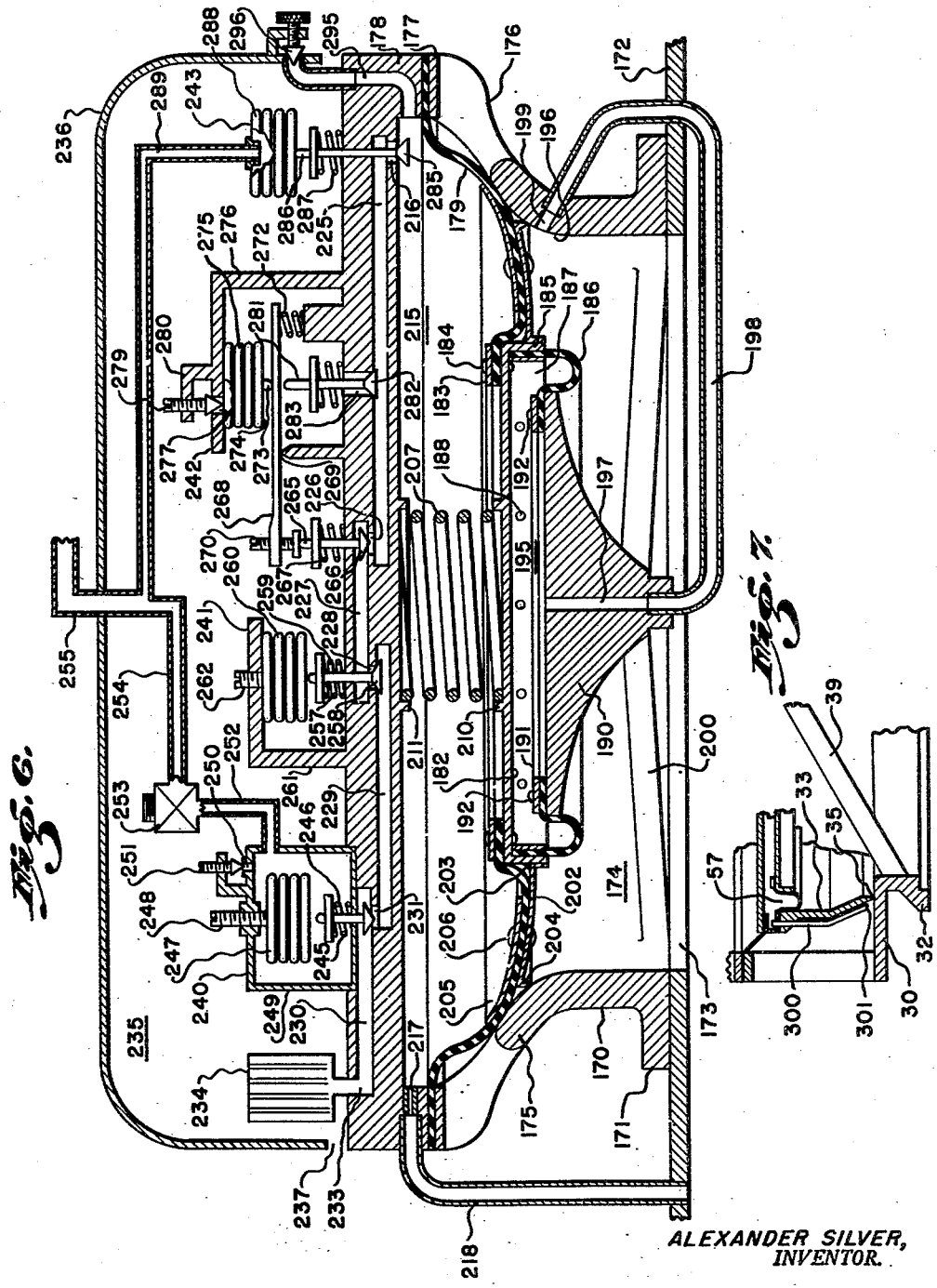
ALEXANDER SILVER,
INVENTOR.
BY
ATTORNEY

United States Patent Office 2,814,241
Patented Nov. 26, 1957

2,814,241

SLAVE VALVE FLOW DISTRIBUTION MEANS

Alexander Silver, Canoga Park, Calif., assignor to The Garrett Corporation, Los Angeles, Calif., a corporation of California Application March 16, 1953, Serial No. 342,687

40 Claims. (Cl. 98—1.5)

This invention relates generally to pressure control mechanisms and relates more particularly to apparatus for controlling the ventilation under pressure of the atmosphere within an enclosure such as an aircraft cabin.

While the invention has particular utility in connection with pressurized ventilation of aircraft cabins and the like, and is shown and described as embodied in such a conditioning system, it is to be understood that its utility is not limited thereto. It is also to be understood that the term "aircraft" is intended to include any vehicle or device which passes through the earth's atmosphere. In many pressure regulating systems, pressure is supplied by any suitable means such as a supercharger, pump, or the like and the ventilation of and pressure within the cabin is controlled by outlet valves. However, certain ventilating problems are encountered.

For example, in military applications, it may be desired or necessary for the flow to be proportioned for delivery to one or more compartments which may contain various types of apparatus such as electronic equipment, guns, radar domes, etc.

The present invention also has utility in commercial applications for maintaining a flow through the cabin in the most desirable manner for the comfort of the passengers. The various outflow valves may be so controlled as to provide the proper proportional flow between them.

The invention also provides means for compensating for pressure drops through bulkheads, interconnecting ducts or other passages through which the air may flow.

It is another object of the invention to provide apparatus wherein each of the outflow valves may be separately calibrated and controlled.

It is still another object of the invention to provide apparatus of this character wherein each outflow valve is provided with a balance chamber and the response of the valve is determined by the pressure in said chamber.

A further object of the invention is to provide mechanism of this character wherein the sensing signal is related to the airflow through the outflow valve.

Other objects and advantages of the invention will appear in the following part of the specification.

Referring to the drawings which are for illustrative purposes only:

Fig. 1 is a schematic view of a ventilating and pressure regulating system embodying the present invention and installed in a pressurized enclosure or aircraft cabin;

Fig. 2 is a sectional view through an outflow valve with the present invention incorporated therein;

Fig. 3 is an enlarged sectional view of a portion of the outflow valve showing the sensing tube for varying the pressure in the balance chamber of said outflow valve;

Fig. 4 is an enlarged sectional view of another portion of said valve;

Fig. 5 is a partial section of another type of outflow valve with the present invention incorporated therein;

Fig. 6 is a sectional view of another type of outflow valve embodying the present invention;

Fig. 7 is a fragmentary sectional view showing an alternative arrangement for sensing airflow for controlling the pressure in the balancing chamber of the outflow valve; and Fig. 8 is a schematic view showing an alternative arrangement of a ventilating and pressure regulating apparatus embodying the present invention.

Referring to Fig. 1, there is shown an enclosure or cabin, indicated generally at 10, which has its interior 11 supplied with air under pressure by a supercharger 12 which may be operated by any suitable source of power such as an engine of the aircraft, an auxiliary engine or the like. There is also a compartment A which communicates with ambient atmosphere through an opening 13 and with the cabin interior through an opening 14 in wall 15 of said cabin. The opening 14 is controlled by an outflow valve 16 which has a pneumatic connection 17, 18 with a pressure control regulating unit 19. There is also a compartment B which has a connection 20 with ambient atmosphere, said opening 20 being controlled by an outflow valve 21 which has a pneumatic connection 22 with a regulating unit 23. The compartment B is also connected with the interior of the cabin through an opening 24 in wall 25 of the cabin and said opening 24 is controlled by an outflow valve 26 having a pneumatic connection 27, 18 with said regulator 19.

In this installation, and by way of example, the supercharger 12 supplies air to the cabin at, say, thirty pounds per minute and this air may be supplied to the compartments A and B in any suitable manner. There may be ten pounds supplied to compartment A and twenty pounds to compartment B. Compartment A discharges directly to ambient atmosphere but compartment B is maintained in a pressurized condition due to the control of the outflow from said compartment by the outflow valve 21.

As shown in Fig. 1, outflow valves 16 and 26 are controlled by the pressure regulator 19 which may be of any suitable type such as, for example, the regulator shown in the application of Bernard N. Maas for Pressure Regulating Mechanism, Serial No. 258,146, filed November 26, 1951. The outflow valve (Fig. 21) is controlled by separate regulator 23 which may also be of a similar type to that shown in the above referred to Maas application. The pressure regulator units for controlling the outflow valves have control pressure chambers which are connected by the conduits 17, 18, 27 and 22 with the regulator units. Various arrangements may be provided for the primary control of the outflow valves, that shown and described being one example thereof.

The outflow valve illustrated in Figs. 2, 3 and 4 includes a base, indicated generally at 30, having an outflow opening 31, there being a flange 32 whereby the valve is attached to the wall of the cabin by suitable well known means.

The flow of air from the opening 31 is controlled by a movable valve member 33 which is generally cylindrical in shape and has a frusto-conical portion with an inwardly tapering surface 34 and a relatively sharp edge 35 engageable with a valve seat 37. Disposed within the valve member 33 is a baffle 38 which is smaller than the inside diameter of the upper end of said valve member 33. The baffle is axially arranged with respect to the valve member 33 and is supported by arms 39 of a spider-like arrangement having a central hub 40 with an axial bore therein. Diaphragm 41, for convenience termed the lower diaphragm, connects the baffle with the valve member 33, said diaphragm 41 being disposed on the upper surface of the baffle 38 with a plate 42 disposed on the surface of the diaphragm 41 opposite the baffle 38. It is to be noted that the plate 42 is of generally the same contour as the inner portion of the baffle and that said plate is of smaller diameter than the baffle. There is an upstanding shaft 44 extending axially of the valve member 33. Shaft 44 has a reduced diameter portion 45 at the lower end thereof and said portion 45 extends through the bore in the hub 40 and is provided with a securing nut 46. In order to provide a larger area for engagement with the plate 42, the shaft 44 has an outwardly extending flange 48 from which the reduced portion 45 extends.

Diaphragm 41 is provided with a peripheral bead 49 received in a recess 50 provided therefor in an interior shoulder portion 51 of the valve member 33 and the peripheral portion of the diaphragm 41 is secured in the recess 50 by the depending flange 53 of a cap 54 which is in the shape of a shallow cup. A plurality of annularly spaced screws 55 secure the cap 54 to the valve member 33. The space 57 between the diaphragm 41 and the plate 42 and the bottom wall of the cap 54 defines a secondary pressure chamber which may be termed a balance chamber.

The bottom wall of the cap 54 is provided with an opening 60 arranged axially with respect to the valve member 33 and coinciding with the opening in the lower end portion of a sleeve 61, said sleeve being slidably mounted on the shaft 44. Sleeve 61 is provided with an outwardly extending flange 62 adjacent the lower end whereby the sleeve is secured to the bottom of the cap 54 by any suitable means such as rivets 63, there being a sealing gasket 64 disposed between the flange 62 and the bottom wall of the cap 54. Thus shaft 44 provides guide means for the valve member 33.

The body 66 of the outflow valve includes an annular part 67 spaced axially from the base 30 and connected thereto by means of a plurality of annularly spaced struts 68. The annular part 67 has a shoulder 69 in which is formed a recess for reception of a peripheral bead 70 of the upper diaphragm 71 which connects the portion 67 with the valve member 33 and cap 54. The diaphragm 71 has an inner peripheral portion 72 clamped between the upper side of the bottom wall of cap 54 and an annular ring 73, these parts being secured together by any suitable means such as the annularly spaced rivets 74. The peripheral bead 70 of the diaphragm 71 is secured in place by a hollow cover 54 which, with diaphragm 71 and cover 87 define a chamber 85 for a valve operating pressure and the diaphragm 71 and cap 54 may be termed a pressure sensitive control element. This pressure sensitive control element is subjected on one side to the operating pressure in chamber 85. On the opposite side the diaphragm 71 and cap 54 are subjected to enclosure or cabin pressure and the pressure in the balance chambers respectively.

Means for urging the valve member in the closing direction comprises a light spring 88 disposed about the sleeve 61 and reacting against the cover 54, there being spring retaining flanges 87a and 54a on the cover 87 and cap 54 respectively.

It is to be noted that the outflow valve member 33 is balanced with respect to ambient atmospheric pressure which prevails within the pocket defined by said valve member, diaphragm 41 and baffle 38. In this respect the mechanism is similar to that disclosed in the application of Richard C. Nelson for Regulator Mounting, Serial No. 285,759, filed May 2, 1952.

The cover 87 is shown as being provided with a pair of tapped bores 90 and 91 respectively. The bore 90 is shown as being closed by a plug 92 and the bore 91 is shown as having a fixture 93 screwed therein, said fixture being carried by conduit 17. If desired, of course, the plug 92 may be omitted and a conduit secured to the tapped opening 90 for connecting the chamber 85 with the control chamber of another regulator.

Means for varying the pressure in the balancing chamber 57 includes a Pitot tube 95. The Pitot tube 95 is generally U-shaped and one leg 96 of said tube has its open free end 97 located adjacent the outflow valve member 33 and also adjacent the free edge 35 of said valve member so that said end 97 of tube 95 will be in the airstream flowing through the outflow valve. The other leg 99 of the tube 95 has an end portion slidable in a gasket 100 received in an annular groove provided therefor in a bore 101 in the base 30. The portion 102 of the Pitot tube 95 connecting the legs 96 and 97 thereof has a portion slidably received in a notch 103 in said base 30 so that the end 97 of the Pitot tube may be adjusted toward and away from the movable valve member 33. An intermediate portion of the leg 99 of the Pitot tube is threaded as at 104 and said threaded portion is received in a knurled nut 105 operably received in a recess 106 provided therefor in the base 30. The nut 105 serves to move the Pitot tube toward or away from the movable valve member 33 and said tube is guided in the notch 103 so as to maintain said tube in proper operating position.

It is to be understood that alternatively the free end of said Pitot tube may be arranged to face against the airstream so that the pressure in the secondary chamber will be higher than when the tube faces downstream. Also it is to be understood that all or a portion of the outflow valve shown in Fig. 1 may be provided with Pitot tubes in accordance with the requirements of any particular installation. Other means may, of course, be employed to provide the desired pressure in the secondary chamber to modify the effect of the control pressure in the main pressure chamber.

The bore 101 in the base 30 is connected to an annular chamber 107 in the hub 40 by means of a passage 108 in one of the arms 39 which support said hub 40. The chamber 107 communicates with a bore 111 in the portion 45 of shaft 44 by means of a cross bore 112. The bore 111 communicates with an enlarged bore 113 in the upper portion of shaft 44 and said bore 113 is connected with the balance chamber 57 by means of cross bore 115. Thus the pressure in chamber 57 is controlled by the pressure sensed by the Pitot tube 95 which is a pressure derived from the airflow at a point adjacent the movable outflow valve member 33.

Referring to Fig. 5, there is shown another type of outflow valve mechanism similar to the outflow valves and regulator mechanism shown in the Kemper Patent No. 2,491,270. The control pressure chamber is indicated at 125 and is defined by a casing 126 and pressure sensitive element or diaphragm 127 which is clamped between an outwardly extending flange 128 of said casing and an outwardly extending flange 129 at one end of a valve casing, indicated generally at 130, the valve casing 130 being shown as comprising a generally cylindrical portion 131 and an outwardly flared portion 132 which has the flange 129 at its outer free end. The portion 131 of the valve casing is provided with a pair of axially spaced partitions 133 and 134 having valve openings 135 and 136 respectively. The openings 135 and 136 are controlled by a pair of movable valve members 137 and 138 mounted on a shaft 139 which extends axially within the valve casing 130. The shaft 139 extends through an opening provided therefor in a partition 140 which is adjacent to but spaced from the diaphragm 127 and defines therewith a balance chamber 141. A sealing gasket 142 is provided in the partition 140 to form a seal with the shaft 139. The seal 142, however, permits longitudinal movement of the shaft 139. The shaft 139 is connected at one end to the diaphragm 127, there being suitable clamping means such as washers 144 for securing the shaft to the diaphragm. The opposite end of the shaft is secured by means of suitable washers 145, to a flexible support member 146 comprising one or more spiral webs separated by slots 147. The support member 146 is marginally clamped between an outwardly extending flange 148 on the adjacent end of the valve casing and a flange 149 of an outwardly curved cap 150 having air inlet openings 151 therein. Air openings 153 and 154 are provided in the casing portion 131 to permit cabin air to enter compartments 155 and 156 at the inlet sides of the valve members 137 and 138. An outlet compartment 158 is provided between the partitions 133 and 134 and valve members 137 and 138 and communicates with an outlet passage 159 defined by conduit 160 having attaching flanges 161 for attaching the valve mechanism to an aircraft wall or the like. Valve members 137 and 138 are urged in the closing direction by a spring 162 and the chamber 125 may be provided with means for controlling the pressure therein or may be connected in the well-known manner with another regulator which may be incorporated in an outflow valve mechanism or may be a separate unit. Means for modifying the response characteristics of the diaphragm 127 includes the chamber 141 and a Pitot tube 164 which has one end connected with said chamber 141 and the opposite end 165 located adjacent the valve member 138 and at the inlet side thereof where it is subjected to airflow past said valve member 138. Adjustable means may be provided for varying the position of the end 165 of the Pitot tube although such means is not shown.

Another alternative mechanism embodying the present invention is shown in Fig. 6 and includes a base 170 having an attached flange 171 for securing the mechanism to a wall 172 of an aircraft cabin, the wall 172 having an outlet opening 173 in register with an outflow passage 174 of the mechanism. The passage 174 is defined by the wall of the base 170, said wall flaring outwardly at 175 and having outflow openings 176 therein. The base also includes an annular member 177 at the upper end thereof between which and the lower edge of a head 178 is marginally clamped a diaphragm 179 which also serves as a valve to control the flow of air through the mechanism.

The diaphragm 179 is ring-shaped and has a central opening therein, the inner marginal edge portion of the diaphragm 179 being clamped between the bottom wall 182 of a shallow cup-shaped member and an annular clamping ring 183. Any suitable means, such as rivets 184, may be used to secure the ring 183, diaphragm and member 182 together.

The member 182 has a depending annular flange 185 against the inner side of which is clamped the marginal edge portion of a diaphragm 186, there being an annular ring 187 for securing said edge portion against the flange 185. Rivets 188 secure the ring 187, diaphragm 186 and flange 185 together.

Diaphragm 186 is annular in shape and the inner marginal edge portion thereof is secured to the upper outer edge portion of a fixed baffle member 190 by means of a clamping ring 191 which is secured by means of screws 192 or the like. The movable member 182, diaphragm 186, and fixed member 190 define a balance chamber 195 which is connected to the throat 196 of the outlet passage 174 by means of a passage 197 in the fixed member 190, conduit 198, and port 199 so that the pressure in chamber 195 is determined by the airflow past the port 199.

Fixed member 190 is supported in spaced relation to the wall of the base 170 defining passage 174 by means of arms 200 which extend from said wall of the base member and are shown as being formed integrally therewith although they may be formed separately and suitably secured by any well-known means.

The flange 185 of the member 182 has an outwardly extending member 202 secured thereto by means of brazing 203 or the like. The outer edge of the member 202 is turned to form a downwardly extending flange 204 which is engageable with the wall of the passage 174 to form part of the outflow valve member controlling the flow of air through the openings 176 and passage 174. An annular plate 205 is secured to the member 202 by means of rivets 206 or by other suitable means. The plate 205 is disposed on the side of the diaphragm 179 opposite the member 202 and extends outwardly to a position for urging the adjacent portion of the diaphragm 179 into engagement with the adjacent wall of the passage 174. Thus a portion of the diaphragm 179 and the flange 204 form a valve portion of the pressure sensitive element which comprises the diaphragm 179 and plate 182.

The member 182 is spaced from the adjacent end of the fixed member 190 and is urged in the valve closing direction by a spring 207 which reacts between said member 182 and the adjacent side of the head 178. The member 182 is provided with a spring retainer 210 and the head is provided with a corresponding spring retainer 211.

The head 178, diaphragm 179 and movable member 182 define a control pressure chamber 215 which has an inlet 216 and an outlet 217, the latter comprising a fixed area bleed orifice which is connected to a region of lower pressure, such as ambient atmosphere by a conduit 218.

The port 216 may be connected with the control pressure chamber of another outflow valve or a separate regulator unit. However, as shown, the means for controlling the pressure in chamber 215 is embodied in the unit shown in Fig. 6.

As shown in Fig. 6, the port 216 is connected to a passage 225 in the head 178 and said passage is connected by means of a port 226 with a passage 227. The latter is connected by means of a port 228 with a passage 229 which in turn is connected with a passage 230 by means of a port 231. Passage 230 has an inlet 233 provided with a filter 234 located within the chamber 235 defined by a cover 236 and having a connection 237 with the interior of the cabin which provides a source of higher pressure. Airflow into the chamber 215 is controlled by various pressure responsive devices arranged in series. These devices comprise a low differential control, indicated generally at 240; an isobaric control, indicated generally at 241; a climb and dive control, indicated generally at 242; and a high differential control, indicated generally at 243. Of course, other controls, not shown, may be included or some of the controls shown may be omitted depending upon the type of installation and control required.

The low differential control 240 includes a valve 245 which controls the port 231. Valve 245 is urged in the opening direction by a spring 246 and there is a bellows 247 having one end anchored by means of a screw 248 threadably received in an opening provided therefor in the end wall of a housing 249. The housing 249 has a restricted connection 250 with the chamber 235 and there is an adjustable valve member 251 for varying the size of the opening 250. The interior of the housing 249 also has a connection with atmosphere which includes a conduit 282, a solenoid valve 253 which is normally closed, conduit 254 and conduit 255. When the solenoid valve 253 is open, the pressure in the interior of housing 249 is determined by a bleeding in of cabin air through orifice 250 and the outflow of air to atmosphere through the solenoid valve and a low differential control is effected accordingly.

The isobaric control 241 includes a movable valve member 257 having a head 258 which controls the port 228. Valve member 257 is urged in the closing direction by a spring 259 and said valve member may be opened by the movable end of an evacuated bellows 260. The opposite end of bellows 260 is secured to a bracket 261 by an adjusting screw 262. Port 226 is controlled by a valve 265 having a head 266 which is adapted to variably control said port 226. Valve 265 is urged in the opening direction by a spring 267 and is adapted to be moved in the closing direction by a lever 268 when the latter is actuated in a counterclockwise direction on a pivot 269 located intermediate the ends of said lever. An adjusting screw 270, adjacent one end of lever 268, engages the upper end of valve member 265. The opposite end of lever 268 is urged upwardly by a spring 272 so that said lever is adapted to engage a boss 273 on the movable end 274 of a bellows 275. The opposite end of bellows 275 is fixed to a bracket 276 and the interior of said bellows is connected with the chamber 235 by means of a restricted bleed tube 277. The size of bleed tube 277 is controlled by an adjustable needle valve 279 mounted in a bracket 280. A valve 281 is provided on the side of the pivot 269 opposite the valve 265 and said valve 281 is provided with a head 282 which controls a port 283 which communicates with the interior of chamber 235. This mechanism 242 thus controls the rate of pressure change in the control pressure chamber 215 in accordance with the flow of air through the bleed tube 277. The rate of change in this mechanism is controlled for both climb and dive.

Port 216 is controlled by the head 285 of a valve member 286 which is urged in the closing direction by spring 287. Valve 286 is controlled by a bellows 288 which is subjected exteriorly to the pressure in chamber 235 and interiorly to ambient atmospheric pressure by means of a conduit 289 which is connected to the conduit 255 to ambient atmosphere. The upper end of bellows 288, as shown in Fig. 6, is fixed while the opposite end is adapted to move and control the position of valve 286.

There is a connection 295 between the chamber 215 and the cabin and this connection is controlled by valve 296 which, when open, vents chamber 215 to the cabin and thus renders the mechanism inoperative. When valve 296 is open, the pressure in chamber 215 is enclosure pressure and the spring 207 will effect closing of the outflow valve. When valve 296 is closed the pressure in chamber 215 is controlled by the various control devices above described and the outflow valve will be actuated in accordance with the differential of pressure on opposite sides of said valve and the diaphragm 179. By connecting the balance chamber 295 with a point of airflow through the outflow valve mechanism, the response characteristics of the outflow valve may be varied as desired.

The mechanism shown in Fig. 7 is similar to that shown in Fig. 2 except that the Pitot tube or flow sensing tube 300 is carried by the outflow valve member 33 and is connected directly to the balance chamber 57. The lower open end 301 of the Pitot tube 300 is disposed adjacent the free edge 35 of the valve member 33 so that it is always in the same relationship to said valve edge. Of course, the position of the end 301 may be adjustable but for any given adjustment the position of said end will be maintained constant with respect to the free edge of the valve member 33.

Another control arrangement embodied in the present invention is shown in Fig. 8 and comprises a plurality of outflow valves indicated generally at 310 and 311 respectively. These valves have control chambers 312 and 313 respectively which are connected to any suitable source of control pressure by means of conduits 314, 315 and 316. The conduit 316 is connected to a regulating unit or mechanism having the pressure control elements desired for a particular installation. The outflow valve members 317 and 318a of the mechanisms 310 and 311 are movable and are connected to diaphragms 71. There are also balancing chambers 318 and 319 for the respective outflow valves 310 and 311, each balancing chamber being defined by valve cover 320, a fixed baffle 321 and a diaphragm 322 connecting the baffle 321 with the movable valve member of the outflow valve.

The pressure in balancing chamber 319 is variable with respect to the chamber 318, there being a connection 330 between the chamber 319 and a region of lower pressure such as ambient atmosphere. The conduit 330 is controlled by a solenoid valve 331 and the latter is controlled, through an amplifier 332, by means of an electrical system which includes a bridge system, indicated generally at 333. The bridge system 333 is connected with a source of power, indicated generally at 334, and includes a pair of resistances A and B respectively. The other legs of the bridge include resistances $r1$ and $r2$, the latter being variable. Movable contact members 335 and 336 are mechanically connected with the respective members 317 and 318 and are movable thereby. The contact members 335 and 336 are electrically connected to the source of power 334 by means of wire 334a and there are connections 337 and 338 between the bridge system and the amplifier, wire 337 being connected between the resistances A and $r1$ and wire 338 being connected between the resistances B and $r2$.

The outflow valve 310 has cabin pressure freely admitted to the balancing chamber 318 and the chamber 319 of outflow valve 311 is connected to the cabin by means of the orifice 319a which is restricted and suitably calibrated.

Proportional flow is controlled by adjusting the variable resistance $r2$ and when there is an increase in the flow, the proportional flow of the outflow valves 310 and 311 will be retained by maintaining the balance in the bridge circuit. Any upset in this balance will cause current to flow in one direction or the other to the solenoid valve to bleed down or restrict the pressure in the balance chamber 319 of the outflow valve 311. Mathematically, the operation of the bridge circuit may be expressed as follows:

$$\frac{A}{B}=\frac{r1}{r2}$$

While the foregoing arrangements have been shown and described as lowering the pressure in the balance chamber or chambers, it is to be understood, of course, that the pressure in such chamber or chambers may be raised to vary the response characteristics of a pressure sensitive means of the outflow valve or valves.

I claim:

1. Mechanism for controlling the pressure within an enclosure, including: a plurality of control devices, each of which includes a pressure responsive element subjected on a portion of one side to enclosure pressure, means defining a pressure chamber, the remaining portion of said one side of said pressure responsive element being subjected to the pressure in said chamber, and walls defining a main control pressure chamber, said pressure responsive element being subjected on its opposite side to the pressure in said main control pressure chamber; walls defining conduit means connecting the main pressure control chambers together, the above mentioned walls defining an enclosure for a control pressure; means for controlling the pressure in said control pressure enclosure; and means for separately controlling the pressure in at least one of the first mentioned pressure chambers.

2. Mechanism for controlling the pressure within an enclosure, including: a plurality of outflow valves, each of which includes a pressure responsive element subjected on a portion of one side to enclosure pressure, means defining a secondary pressure chamber, the remaining portion of said one side of said pressure responsive element being subjected to the pressure in said chamber, and walls defining a main control pressure chamber, said pressure responsive element being subjected on its opposite side to the pressure in said main control pressure chamber; walls defining conduit means connecting the main pressure control chambers together so that the pressures therein may be maintained substantially equal; means for controlling the pressure in said control pressure chambers; and means for separately controlling the pressure in at least one of said secondary pressure chambers respectively.

3. Mechanism for controlling the pressure within an enclosure, including: a plurality of control devices, each of which includes a pressure responsive element, means defining a pressure chamber, at least a portion of one side of said pressure responsive element being subjected to the pressure in said chamber, and walls defining a main control pressure chamber, said pressure responsive element being subjected on its opposite side to the pressure in said main control pressure chamber; walls defining conduit means connecting the main pressure control chambers together; and means for controlling the pressure in at least one of the respective first mentioned pressure chambers independently of the other of said first mentioned pressure chambers.

4. Mechanism for controlling the pressure within an enclosure, including: a plurality of outflow valves, each of which includes an outlet opening and a movable valve member cooperable therewith, a pressure responsive element operably connected with said valve member and subjected on a portion of one side to enclosure pressure, means defining a pressure chamber, the remaining portion of said one side of said pressure responsive element being subjected to the pressure in said chamber, and walls defining a main control pressure chamber, said pressure responsive element being subjected on its opposite side to the pressure in said main control pressure chamber; means connecting the main pressure control chambers together; means for controlling the pressure in said main control pressure chambers; and means for separately controlling the pressure in at least one of the first mentioned pressure chambers in accordance with the pressure adjacent the upstream side of the respective movable valve members.

5. Mechanism for controlling the pressure within an enclosure, including: a plurality of outflow valves, each of which includes a pressure responsive element subjected on a portion of one side to enclosure pressure, means defining a pressure chamber, the remaining portion of said one side of said pressure responsive element being subjected to the pressure in said chamber, and walls defining a main control pressure chamber, said pressure responsive element being subjected on its opposite side to the pressure in said main control pressure chamber; means for controlling the pressure in said main control pressure chambers; and means for controlling the pressure in at least one of the first mentioned pressure chambers independently of another of said first mentioned pressure chambers.

6. Mechanism for controlling the pressure within an enclosure, including: a plurality of control devices, each of which includes a balanced valve member, a pressure responsive element controlling said valve member and subjected on a portion of one side to enclosure pressure, means defining a pressure chamber, the remaining portion of said one side of said pressure responsive element being subjected to the pressure in said chamber, and walls defining a main control pressure chamber, said pressure responsive element being subjected on its opposite side to the pressure in said main control pressure chamber; means for controlling the pressure in said main control pressure chambers; and means for controlling the pressure in the first mentioned pressure chambers independently of each other.

7. Mechanism for controlling the pressure within an enclosure, including: a plurality of control devices, each of which includes a balanced valve member, a pressure responsive element controlling said valve member and subjected on a portion of one side to enclosure pressure, means defining a pressure chamber, the remaining portion of said one side of said pressure responsive element being subjected to the pressure in said chamber, and walls defining a main control pressure chamber, said pressure responsive element being subjected on its opposite side to the pressure in said main control pressure chamber; means for controlling the pressure in said main control pressure chambers; and means for controlling the pressure in at least one of the first mentioned pressure chambers.

8. Mechanism for controlling the pressure in an enclosure, including: a plurality of outflow valves, each comprising a main pressure chamber, a pressure responsive element subjected on one side to the pressure in said chamber, means defining a secondary pressure chamber, at least a portion of said opposite side of the pressure responsive element being subjected to the pressure in said secondary pressure chamber, a movable valve member controlled by said pressure responsive element, and means defining an outlet and a valve seat about said outlet, said valve member cooperating with said valve seat; pressure regulating means for said main pressure chambers; and means individually controlling the pressure in the secondary chambers.

9. Mechanism for controlling the pressure in an enclosure, including: a plurality of outflow valves, at least one of which comprises a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining a valve seat about an outlet, said valve member cooperating with said valve seat; pressure regulating means for said main pressure chamber; and means controlling the pressure in the secondary chamber.

10. Mechanism for controlling the pressure in an enclosure, including: a plurality of outflow valves, each comprising a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining an outlet controlled by said valve member; pressure regulating means for said main pressure chambers; and means individually controlling the pressure in the secondary chambers, each of said means sensing the pressure of the air stream flowing between said valve member and said outlet.

11. Mechanism for controlling the pressure in an enclosure, including: a plurality of outflow valves, each comprising a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining an outlet controlled by said valve member; and a tube connected with at least one of the secondary chambers, said tube having an open end located within the air stream flowing between one of said valve members and the outlet controlled thereby, said open tube end being located on the upstream side of said valve member and facing downstream.

12. Mechanism for controlling the pressure in an enclosure, including: a plurality of outflow valves, each comprising a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining an outlet controlled by said valve member; and a tube connected with at least one of the secondary chambers, said tube having an open end located within the air stream flowing between one of said valve members and the outlet controlled thereby, said open tube end being located on the upstream side of said valve member.

13. Mechanism for controlling the pressure in an enclosure, including: a plurality of outflow valves, each comprising a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining an outlet controlled by said valve member; and a tube connected with at least one of the secondary chambers, said tube having an open end located within the air stream flowing between one of said valve members and the outlet controlled thereby.

14. Mechanism for controlling the pressure in an enclosure, including: a plurality of outflow valves, each comprising a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining a valve seat cooperable with said valve member; means controlling the pressure in said main pressure chambers; and pressure sensing means controlling the pressure in at least one of said secondary chambers, said means sensing the pressure of the air adjacent to and upstream of said valve member; and means for varying the position of said pressure sensing means relative to said valve member.

15. Mechanism for controlling the pressure in an enclosure, including: a plurality of outflow valves, each comprising a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining a valve seat, said valve member having a part cooperable with said valve seat; and means carried by the movable valve member of one of said outflow valves, said means being connected with the secondary chamber of said outflow valve and being adapted to control the pressure in said secondary chamber.

16. The invention defined by claim 15 wherein the last mentioned means comprises a tube having an open end located adjacent the part of the movable valve member which cooperates with the valve seat thereof.

17. The invention defined by claim 15 wherein the last mentioned means comprises a tube having an open end located adjacent the free edge of said valve member and facing toward the part of said valve member cooperable with the valve seat thereof.

18. Mechanism for controlling the pressure in an enclosure, including: a plurality of outflow valves, each comprising a main pressure chamber, a pressure responsive element subjected on one side to the pressure in said chamber, means defining a secondary pressure chamber, the opposite side of said pressure responsive element being subjected to the pressure in said secondary pressure chamber, and a movable valve member controlled by said pressure responsive element; and means for effecting proportional flow through said outflow valves, including a tube connected with at least one of the secondary chambers, said tube having an open end located within the air stream flowing past one of said valve members.

19. Mechanism for controlling the pressure in an enclosure, including: a plurality of outflow valves, each comprising a main pressure chamber, a pressure responsive control element subjected on one side to the pressure in said chamber, means defining a secondary pressure chamber, at least a portion of the opposite side of said pressure responsive element being subjected to the pressure in said secondary pressure chamber, and means connected with at least one of the secondary chambers for controlling the pressure in said one secondary chamber so that the outflow valve having said secondary chamber will have a predetermined proportional flow therethrough relative to another of said valves.

20. In mechanism for controlling the pressure in an enclosure: a plurality of outflow control valves at least one of which has means defining parallel passages for the flow of fluid, including a pair of partition walls having valve openings therein defined by valve seats in said walls, said passages being separated by an outflow compartment leading to a region of lower pressure, a pair of valve elements adapted to cooperate with said valve seats for controlling the flow of fluid through said openings, a pressure sensitive element to which said valve elements are both connected for movement in unison therewith and with each other, means defining a main control pressure chamber on one side of said pressure sensitive element, means defining a secondary pressure chamber on the opposite side of said element, and pressure sensing means connecting said secondary chamber with a point adjacent one of said valve elements.

21. Mechanism for controlling the pressure in an enclosure, including: a plurality of outflow valves, each comprising a main pressure chamber, means for connecting said chambers to a source of control pressure, a pressure responsive element subjected on one side to the pressure in said chamber, means defining a secondary pressure chamber, having an inlet passage and an outlet passage, at least a portion of said opposite side of the pressure responsive element being subjected to the pressure in said secondary pressure chamber, a movable valve member controlled by said pressure responsive element, and means defining an outlet controlled by said valve member; and means controlling one of said passages of at least one of said outflow valves.

22. The invention defined by claim 21 wherein the last mentioned means comprises a valve.

23. The invention defined by claim 21 wherein the last mentioned means comprises an electrically controlled valve.

24. Mechanism for controlling the pressure in an enclosure, including: a plurality of outflow valves, each comprising a main pressure chamber, means for connecting each of said chambers to a control pressure source, a pressure responsive element subjected on one side to the pressure in said chamber and on the opposite side to enclosure pressure over a portion of its area, means defining a secondary pressure chamber having an inlet connected with said enclosure and an outlet connected with a region of lower pressure, the remaining portion of said opposite side of the pressure responsive element being subjected to the pressure in said secondary pressure chamber, a movable valve member controlled by said pressure responsive element, and means defining an outlet controlled by said valve member; an electrically operable valve controlling the secondary chamber outlet of at least one of said outflow valves; an electrical system for said electrically operable valve, said electrical system including a Wheatstone bridge having a pair of movable contact members; and connecting means between the pressure sensitive element of said outflow valves and the respective movable contact members.

25. The invention defined by claim 24 including a variable resistance in one arm of said bridge.

26. Mechanism for controlling the pressure in an enclosure, including: a plurality of outflow valves, each comprising a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining an outlet passage controlled by said valve member, said passage having a throat; and a tube connected with at least one of the secondary chambers, said tube having an open end located at said throat.

27. Mechanism for controlling the pressure in an enclosure, including: a plurality of outflow valves, each comprising a main pressure chamber, a pressure responsive element subjected on one side to the pressure in said chamber and on the opposite side to enclosure pressure over a portion of its area, means defining a secondary pressure chamber, the remaining portion of said opposite side of the pressure responsive element being subjected to the pressure in said secondary pressure chamber, a movable valve member controlled by said pressure responsive element, and means defining an outlet passage controlled by said valve member; and a tube connected with at least one of the secondary chambers, said tube having an open end positioned downstream of said valve member.

28. Mechanism for controlling the pressure in an enclosure, comprising: a plurality of outflow valves, each including a pressure sensitive element; means defining a control pressure chamber on one side of said element; means defining a modifying pressure chamber on the opposite side of said element; means for controlling the pressure in the control pressure chamber; and means for controlling the pressure in the modifying chamber of at least one of said outflow valves so as to effect a predetermined proportional flow control therethrough with the respect to another of said outflow valves.

29. In mechanism for controlling the pressure in an enclosure: means defining a main pressure chamber; a pressure responsive element subjected on one side to the pressure in said chamber and on the opposite side to enclosure pressure over a portion of its area; means defining a secondary pressure chamber, the remaining portion of said opposite side of the pressure responsive element being subjected to the pressure in said secondary pressure chamber; a movable valve member controlled by said pressure responsive element; means defining a valve seat, said valve member cooperating with said valve seat; pressure regulating means for controlling the pressure in said main pressure chamber; and a tube connected with said secondary chamber, said tube having an open end located adjacent the part of the movable valve member cooperating with the valve seat.

30. In mechanism for controlling the pressure in an enclosure: means defining parallel passages for the flow of fluid, including a pair of partition walls having valve openings therein defined by valve seats in said walls, said passages being separated by an outflow compartment leading to a region of lower pressure; a pair of valve elements adapted to cooperate with said valve seats for controlling the flow of fluid through said openings; a pressure sensitive element to which said valve elements are both connected for movement in unison therewith and with each other; means defining a main control pressure chamber on one side of the pressure sensitive element; means defining a secondary pressure chamber on the opposite side of said element; and pressure sensing means connecting said secondary chamber with a point adjacent one of said valve elements and establishing a pressure in said secondary chamber corresponding to the pressure at said point.

31. In mechanism for controlling the pressure in an enclosure: means defining a main pressure chamber; means for connecting said chamber to a source of control pressure; a pressure responsive element subjected on one side to the pressure in said chamber and on the opposite side to enclosure pressure over a portion of its area; means defining a secondary pressure chamber having an inlet passage and an outlet passage, the remaining portion of said opposite side of the pressure responsive element being subjected to the pressure in said secondary pressure chamber; a movable valve member controlled by said pressure responsive element; means defining an outlet controlled by said valve member; and means controlling one of said passages of said secondary pressure chamber.

32. The invention defined by claim 31 wherein the last mentioned means comprises a valve.

33. The invention defined by claim 31 wherein the last mentioned means comprises an electrically controlled valve.

34. In mechanism for controlling the pressure in an enclosure: means defining a main pressure chamber; a pressure responsive element subjected on one side to the pressure in said chamber and on the opposite side to enclosure pressure over a portion of its area; means defining a secondary pressure chamber, the remaining portion of said opposite side of the pressure responsive element being subjected to the pressure in said secondary chamber; a movable valve member controlled by said pressure responsive element; means defining an outlet passage controlled by said valve member, said passage having a throat; and a tube connected with said secondary chamber, said tube having an open end located at said throat.

35. In mechanism for controlling the pressure in an enclosure: walls defining a main pressure chamber; a pressure responsive element subjected on one side to the pressure in said chamber and on the opposite side to enclosure pressure over a portion of its area; means defining a secondary pressure chamber, the remaining portion of said opposite side of the pressure responsive element being subjected to the pressure in said secondary pressure chamber; a movable valve member controlled by said pressure responsive element; means defining an outlet passage controlled by said valve member; and a tube connected with said secondary chamber, said tube having an open end positioned downstream of said valve member.

36. In mechanism for controlling the pressure in an enclosure: walls defining a main pressure chamber; a pressure responsive element subjected on one side to the pressure in said chamber and on the opposite side to enclosure pressure over a portion of its area; means defining a secondary pressure chamber, the remaining portion of said opposite side of the pressure responsive element being subjected to the pressure in said secondary pressure chamber; a movable valve member controlled by said pressure responsive element; means defining an outlet controlled by said valve member; pressure regulating means for controlling the pressure in said control pressure chamber; and means controlling the pressure in the secondary chamber, said means sensing the pressure of the air stream flowing between said valve member and said outlet.

37. In mechanism for controlling the pressure in an enclosure: walls defining a main pressure chamber; a pressure responsive element subjected on one side to the pressure in said chamber and on the opposite side to enclosure pressure over a portion of its area; means defining a secondary pressure chamber, the remaining portion of said opposite side of the pressure responsive element being subjected to the pressure in said secondary pressure chamber; a movable valve member controlled by said pressure responsive element; means defining an outlet controlled by said valve member; pressure regulating means for controlling the pressure in said control pressure chamber; and a tube connected with said secondary chamber, said tube having an open end located within the air stream flowing between said valve member and said outlet, said open tube end being located on the upstream of said valve member and facing downstream.

38. In mechanism for controlling the pressure in an enclosure: wall means defining a main pressure chamber; a pressure sensitive element subjected on one side to the pressure in said chamber and on the opposite side to enclosure pressure over a portion of its area; means defining a secondary pressure chamber, the remaining portion of said opposite side of the pressure sensitive element being subjected at all times to the pressure in said secondary pressure chamber; a movable valve member controlled by said pressure sensitive element; means defining a valve seat, said valve member having a part cooperable with said valve seat; and means carried by the movable valve member, said means being connected with the secondary chamber and being adapted to control the pressure in said secondary chamber.

39. The invention defined by claim 38 wherein the last mentioned means comprises a tube having an open end located adjacent the part of the movable valve member which cooperates with said valve seat.

40. The invention defined by claim 38 wherein the last mentioned means comprises a tube having an open end located adjacent and facing toward the part of the movable valve member which cooperates with said valve seat.

References Cited in the file of this patent

UNITED STATES PATENTS

| | | |
|---|---|---|
| 2,402,681 | Schroeder | June 25, 1946 |
| 2,463,487 | Widgery et al. | Mar. 1, 1949 |
| 2,491,270 | Kemper | Dec. 13, 1949 |
| 2,510,976 | Herrala et al. | June 13, 1950 |
| 2,562,684 | Wood | July 31, 1951 |
| 2,590,330 | Krueger | Mar. 25, 1952 |
| 2,651,985 | Warstler | Sept. 15, 1953 |
| 2,672,086 | Jensen | Mar. 16, 1954 |